(12) United States Patent
Hoshiya et al.

(10) Patent No.: US 6,315,068 B1
(45) Date of Patent: Nov. 13, 2001

(54) DRIVE CONTROL SYSTEM FOR HYBRID VEHICLES

(75) Inventors: Kazumi Hoshiya, Gotenba; Hidehiro Oba, Aichi-gun, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/253,521

(22) Filed: Feb. 19, 1999

(30) Foreign Application Priority Data

Mar. 6, 1998 (JP) .................................................. 10-073513

(51) Int. Cl.[7] .................................................. B60K 1/00
(52) U.S. Cl. ...................... 180/65.2; 180/65.3; 180/65.6; 180/65.8; 477/20
(58) Field of Search ................................ 180/65.2, 65.8, 180/65.6; 701/22; 477/20

(56) References Cited

U.S. PATENT DOCUMENTS

| | | | |
|---|---|---|---|
| 4,393,964 | * | 7/1983 | Kemper ............................ 180/165 x |
| 5,359,308 | * | 10/1994 | Sun et al. ......................... 180/65.2 x |
| 5,495,912 | * | 3/1996 | Gray, Jr. et al. ................. 180/65.2 X |
| 5,558,588 | * | 9/1996 | Schmitt ............................ 180/65.2 X |
| 5,614,809 | * | 3/1997 | Kiuchi et al. .................... 180/65.2 X |
| 5,806,617 | * | 9/1998 | Yamaguchi ......................... 180/65.2 |
| 5,823,282 | * | 10/1998 | Yamaguchi ......................... 180/65.2 |
| 5,856,709 | * | 1/1999 | Ibaraki et al. ......................... 290/45 |
| 5,887,670 | * | 3/1999 | Tabata et al. ...................... 180/65.2 |
| 5,895,333 | * | 4/1999 | Morisawa ............................... 475/5 |
| 6,019,699 | * | 2/2000 | Hoshiya et al. ....................... 477/20 |
| 6,081,042 | * | 6/2000 | Tabata et al. .................... 180/65.2 x |

FOREIGN PATENT DOCUMENTS

A-9-58301   3/1997  (JP) .

* cited by examiner

*Primary Examiner*—Lanna Mai
*Assistant Examiner*—Toan C To
(74) *Attorney, Agent, or Firm*—Oliff & Berridge, PLC

(57) ABSTRACT

A drive control system for a hybrid vehicle, in which the output torques of an electric motor and an internal combustion engine are synthesized by and outputted from a torque synthesizing/distributing mechanism. The target speed of the engine is determined on the basis of the output demand for the engine and the output speed of the torque synthesizing/distributing mechanism, and the target speed of the motor is determined on the basis of the target speed of the engine and the output speed of the torque synthesizing/distributing mechanism. The output of the engine is controlled to the output torque which is determined on the basis of the output demand for the engine and the target speed of the engine, and the output speed of the motor is controlled to the target speed.

9 Claims, 7 Drawing Sheets

| RUNNING MODE | CLUTCH | |
|---|---|---|
| | Ci | Cd |
| MOTOR RUNNING MODE | × | O |
| ENGINE RUNNING MODE | O | O |
| ASSIST MODE | O | × |
| NEUTRAL MODE | × | × |

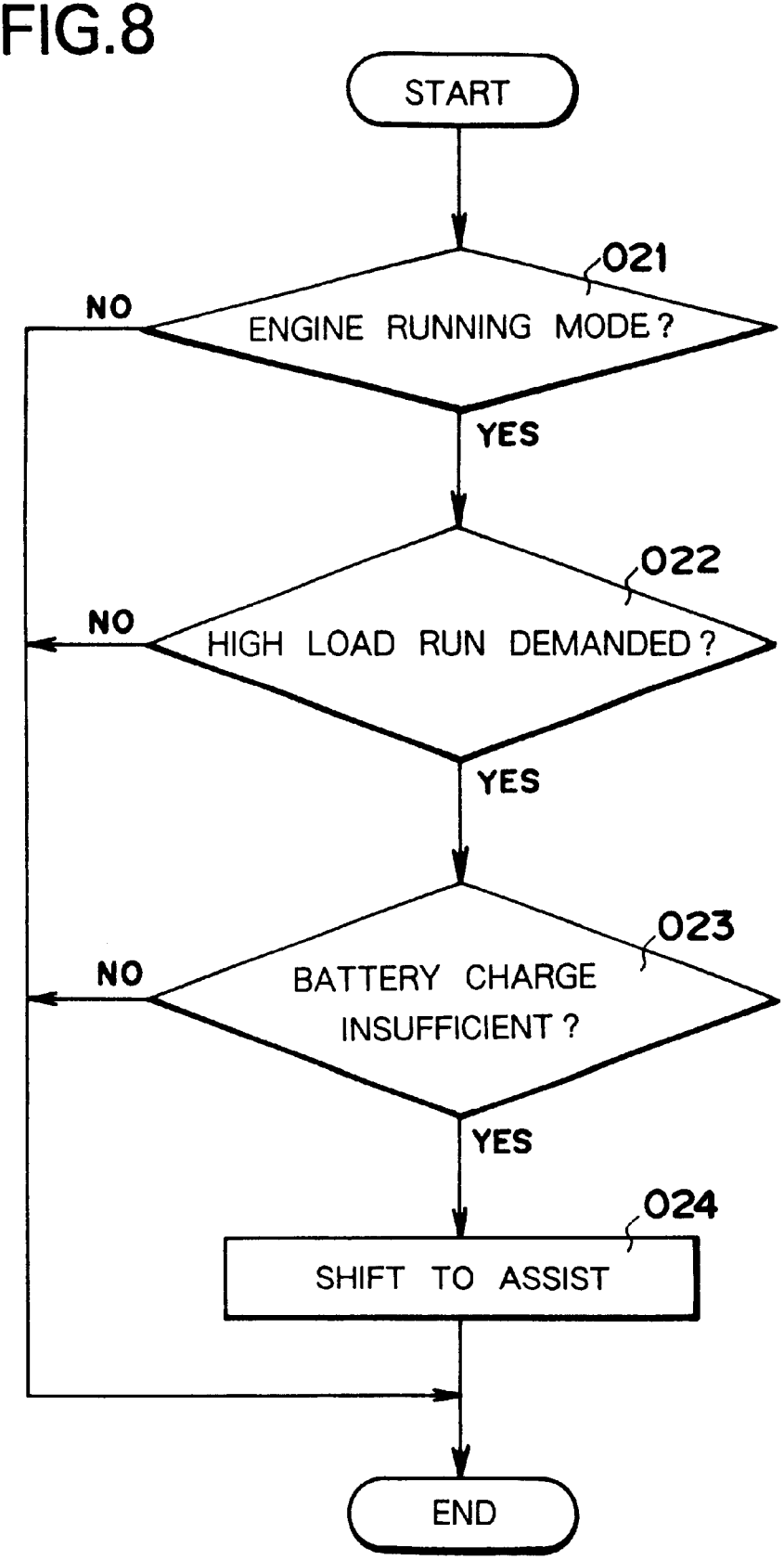

DRIVE CONTROL SYSTEM FOR HYBRID VEHICLES

BACKGROUND OF THE INVENTION

1. Field of the Invention

The present invention relates to a system for controlling a driving force in a hybrid vehicle which is provided as its prime mover with an internal combustion engine such as a gasoline engine or a Diesel engine and an electric motor such as a motor/generator for outputting a torque when energized by an electric power. More particularly, the invention relates to a hybrid vehicle drive control system which is enabled to synthesize and output the output torque of the internal combustion engine and the output torque of the electric motor by a torque synthesizing/distributing mechanism made of a planetary gear mechanism.

2. Related Art

As the type of the hybrid vehicle employing the aforementioned internal combustion engine and electric motor as its prime mover, there is known a series hybrid type using the internal combustion engine only for driving a generator or a parallel hybrid type using the internal combustion engine for both the power generation and the running power. The drive system of the latter parallel hybrid type is exemplified by a construction in which the output torque of the internal combustion engine and the output torque of the electric motor are synthesized by and outputted from a torque synthesizing/distributing mechanism, as disclosed in Japanese Patent Laid-Open No. 193676/1997 (JP-A-9-193676).

The torque synthesizing/distributing mechanism of the disclosed hybrid vehicle drive control system is constructed of one set of single pinion type planetary gear mechanism, in which the rotary shaft of the motor/generator is connected to a sun gear, in which the output shaft (or crankshaft) of the engine is connected to a ring gear through an input clutch and in which a carrier is connected to the input shaft of a transmission. Between the carrier and the sun gear, moreover, there is interposed an integral clutch for rotating the torque synthesizing/distributing mechanism integrally as a whole.

In the drive system of the prior art, therefore, only the motor/generator is connected to the transmission through the torque synthesizing/distributing mechanism by releasing the input clutch and applying the integral clutch so that the vehicle can be run by the motor/generator. With the input clutch being applied but the integral clutch being released, on the other hand, the planetary gear mechanism constructing the torque synthesizing/distributing mechanism performs the differential action so that the vehicle can be run by adding the output torque of the motor/generator to the engine torque while generating the electric power. If both the integral clutch and the input clutch are applied, moreover, the vehicle can be run while generating the electric power.

Thus, the hybrid vehicle equipped with the torque synthesizing/distributing mechanism can be set with various running modes depending upon how to output the torques of the engine and the motor/generator or how to transmit the torques inbetween. When an accelerator pedal is depressed, for example, to demand a high driving force (or acceleration force), the so-called assist mode, in which the output torque of the motor/generator is added to the engine torque, is set to execute the control to increase the output torque of the motor/generator gradually while increasing the engine output. By performing these controls, a necessary and sufficient driving force can be established.

When a demand for increasing the driving force is made in the drive system of the prior art, the so-called "assist mode" is set so that the torque to be inputted to the transmission is augmented by increasing the engine output and the output of the motor/generator. If, in this case, the speed of the motor/generator is evenly raised to bring the entirety of the torque synthesizing/distributing mechanism finally into an integrally rotating state, the torque to appear at the carrier acting as the output member of the torque synthesizing/distributing mechanism, i.e., the input torque of the transmission may fluctuate in magnitude to deteriorate the riding comfort.

Even if an increase in the driving force is demanded by depressing the accelerator pedal, more specifically, the accelerator pedal may not be always kept at the depressed opening but may be changed in its depression stroke according to the running situations or the taste of the driver. In this case, the engine torque may fluctuate to change the summed output torque of the engine torque and the torque of the motor/generator independently of the change in the accelerator opening. This may change the magnitude of the driving force to deteriorate the riding comfort.

SUMMARY OF THE INVENTION

A principal object of the invention is to provide a drive control system capable of changing the driving force smoothly according to a change in a demanded output while a vehicle is being run by synthesizing the output torque of an internal combustion engine and the output torque of an electric motor.

The drive control system of the invention is applied to a hybrid vehicle in which the output torque of the electric motor and the output torque of the internal combustion engine are outputted through a torque synthesizing/distributing mechanism. In the drive control system of the invention, moreover, the target speed of the engine is determined on the basis of an output demand for the engine so that the target value or the controlled variable of the output torque of the engine together with the target speed or the controlled variable of the motor is determined on the basis of the target speed of the engine. Specifically, the output of the motor is controlled on the basis of the data including the target speed of the engine so that the output of the motor changes according to the fluctuation in the output of the engine. As a result, the temporary change in the output of the engine does not appear as it is in the output torque of the torque synthesizing/distributing mechanism so that the change in the driving force of the hybrid vehicle is smoothed to prevent the deterioration in the riding comfort.

In the invention, moreover, the motor speed control means can be replaced by motor torque control means for controlling the output torque of the motor to set the speed of the motor to the target speed. With this construction, the output torque of the motor is controlled to set the speed of the motor to the target value.

The drive control system of the invention can further comprise speed control means for setting the target speed of the engine so as to eliminate the difference among the speed of the engine, the speed of the motor and the output speed of the torque synthesizing/distributing mechanism as the vehicle speed increases. With this construction, the target speed of the engine is set to equalize the speed of the engine, the speed of the motor and the output speed of the torque synthesizing/distributing mechanism as the vehicle speed increases. This can smoothen the control to bring the entirety of the torque synthesizing/distributing mechanism into an integrally rotational state (or an integral state) for the run with the engine.

In the drive control system of the invention, the torque synthesizing/distributing mechanism may include a gear mechanism having three rotary components for performing a differential action. In this case, an oil pressure is abruptly fed to a clutch for integrating the gear mechanism as a whole by connecting the two rotary elements in response to a demand for increasing the output of the engine, thereby to reduce the pack clearance. After the clutch was completely applied, moreover, the output torque of the motor is gradually lowered.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 8 is a flow chart showing one example of a control routine for charging the battery when a high load run is demanded.

DETAILED DESCRIPTION OF THE PREFERRED EMBODIMENT

The invention will be described in more detail with reference to the accompanying drawings. The invention relates to a drive control system for a hybrid vehicle employing an electric motor and an internal combustion engine as its motive force sources. Here, the internal combustion engine is, in short, a motive force source for outputting a motive power by burning a fuel, as specified by a gasoline engine, a Diesel engine or a gas engine using a gaseous fuel such as a hydrogen gas and as classified into not only a reciprocating engine but also a turbine engine. Moreover, the internal combustion engine will be abbreviated into the "engine" in the following description.

On the other hand, the electric motor is, in short, a motive force source to be electrically activated to output a motive power, as specified by a variety of motors such as a stationary magnet type synchronous motor or a DC motor and further by a motor/generator to be driven by an external power to generate an electric power. Moreover, the electric motor can be used with a power generator. Here, the electric motor will be exemplified by the motor/generator.

The hybrid vehicle, to which the invention is applied, is of the type in which the engine is rotated by the output of the electric motor and started by feeding it with the fuel when its speed reaches a predetermined level. Specifically, the engine and the electric motor are coupled to a torque synthesizing/distributing mechanism so that the engine can be driven by the output torque of the electric motor, so that the output torques of these electric motor and engine can be synthesized and outputted by the torque synthesizing/distributing mechanism, and so that the output torque of the engine can be distributed to the electric motor and a transmission by the torque synthesizing/distributing mechanism. Thus, the torque synthesizing/distributing mechanism can be constructed of a planetary gear mechanism. Moreover, the speed change mechanism, as connected to the output side of the torque synthesizing/distributing mechanism, can be exemplified by an automatic transmission for controlling the gear ratio in accordance with the running state such as a vehicle speed or an engine load.

Figure 2:
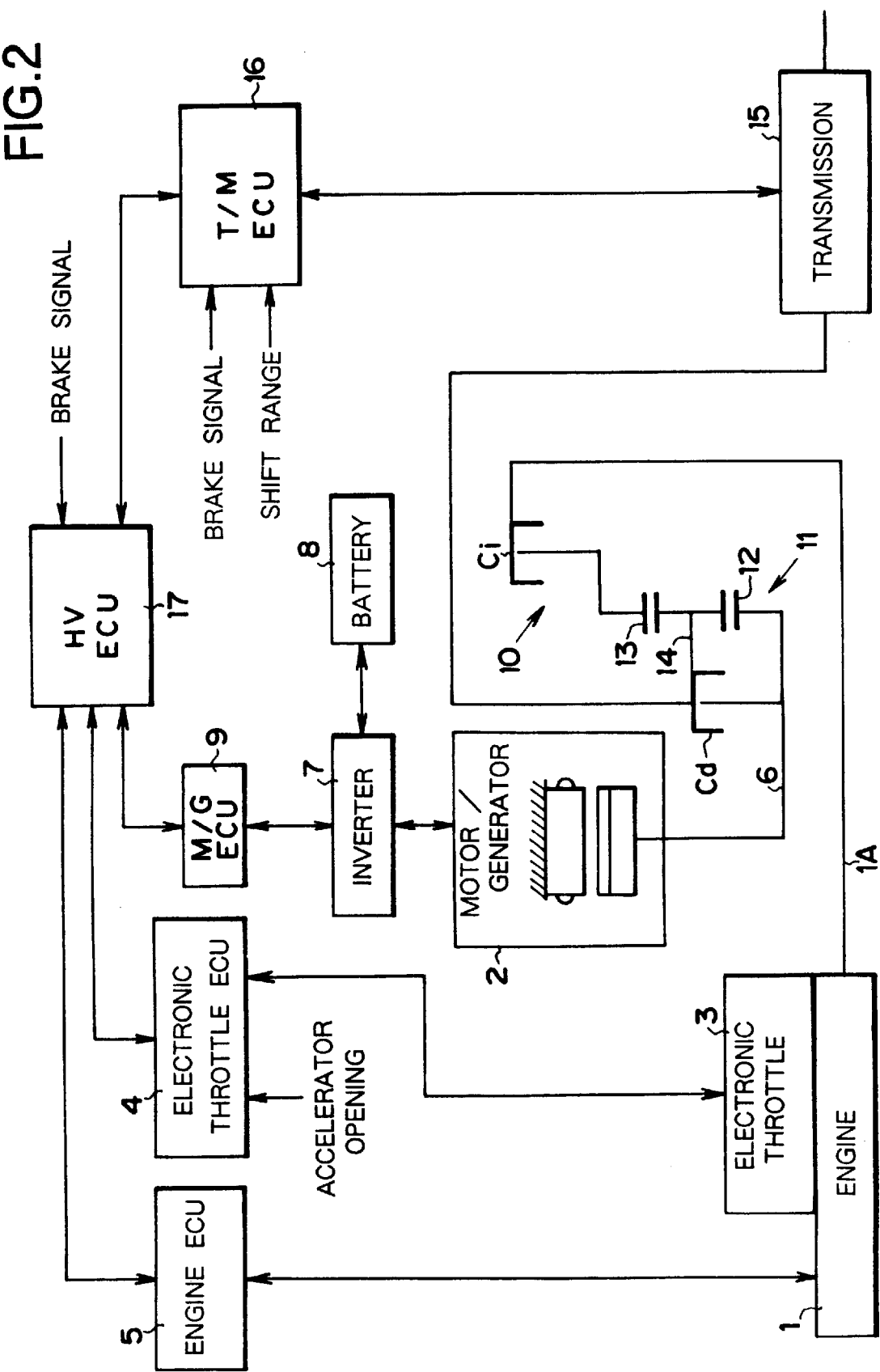
FIG. 2 is a diagram schematically showing one example of a drive system of a hybrid vehicle to which the invention is applied.

FIG. 2 shows an entire construction of a drive system in a hybrid vehicle according to the invention. This drive system is equipped as a prime mover with an engine 1 and a motor/generator 2. The engine 1 is equipped with an electronic throttle valve 3 for increasing the degree of throttle opening in accordance with the depression of the not-shown accelerator pedal. There is provided an electronic throttle electronic control unit (or an electronic throttle ECU) 4 mainly for controlling the opening of the electronic throttle valve 3. This electronic control unit 4 is fed with an accelerator opening signal indicating the depression of the accelerator pedal, that is, the output demand for the engine 1 (or the output demand for the hybrid vehicle) to output a throttle opening signal, as based on the accelerator opening signal, to the electronic throttle valve 3. Here, the characteristic values for determining the relation between the accelerator opening and the throttle opening can be changed either according to the state of the vehicle or by the manual operation of the driver. There is further provided an engine electronic control unit (or an engine ECU) 5 for controlling the engine 1.

The motor/generator 2 is given a known construction in which an output torque is established at a rotary shaft 6 integrated with a rotor when the rotor is rotated by energizing a coil and in which an electromotive force is generated at the coil by rotating the rotor by an external force through the rotary shaft 6. A battery 8 is connected with the motor/generator 2 through an inverter 7. In order to control the rotation of the motor/generator 2, moreover, a motor/generator electronic control unit (M/G-ECU) 9 is connected with the inverter 7.

The engine 1 and the motor/generator 2 thus far described are coupled to a torque synthesizing/distributing mechanism 10. This torque synthesizing/distributing mechanism 10 is constructed mainly of a set of a single pinion type planetary gear mechanism 11 and two clutches Ci and Cd. A sun gear 12 or a first rotary element of the planetary gear mechanism 11 is mounted on the rotary shaft, 6 of the motor/generator 2. An output member is provided either by a carrier 14 (corresponding to a third rotary element) holding a pinion gear which is arranged between the sun gear 12 and a ring gear 13 (corresponding to a second rotary element) or an internal gear arranged concentrically with that sun gear 12, or by a (not-shown) member such as a shaft integrated with that carrier 14.

The input clutch Ci is arranged between the ring gear 13 and an output shaft 1A of the engine 1 for coupling them selectively. Moreover, the integral clutch Cd integrates the entirety of the planetary gear mechanism 11 by coupling any two rotary elements (e.g., the sun gear 12 and the carrier 14) in the planetary gear mechanism 11. Here, these clutches Ci and Cd are made of friction clutches to be hydraulically applied.

The carrier 14 corresponds to the output member of the torque synthesizing/distributing mechanism 10 and is connected to a transmission 15. This transmission 15 is an automatic one capable of controlling the gear ratio electrically and is provided with a transmission electronic control unit (T/M-ECU) 16. This electronic control unit 16 is fed with signals such as a brake signal or a shift range signal indicating the state of the vehicle.

The individual electronic control units 4, 5, 9 and 16 thus far described are connected for data communications with a hybrid electronic control unit 17. This hybrid electronic control unit 17 is fed with signals such as the brake signal indicating the state of the vehicle and communicates to transmit data with the other electronic control units 4, 5, 9 and 16.

Figures 3, 4:
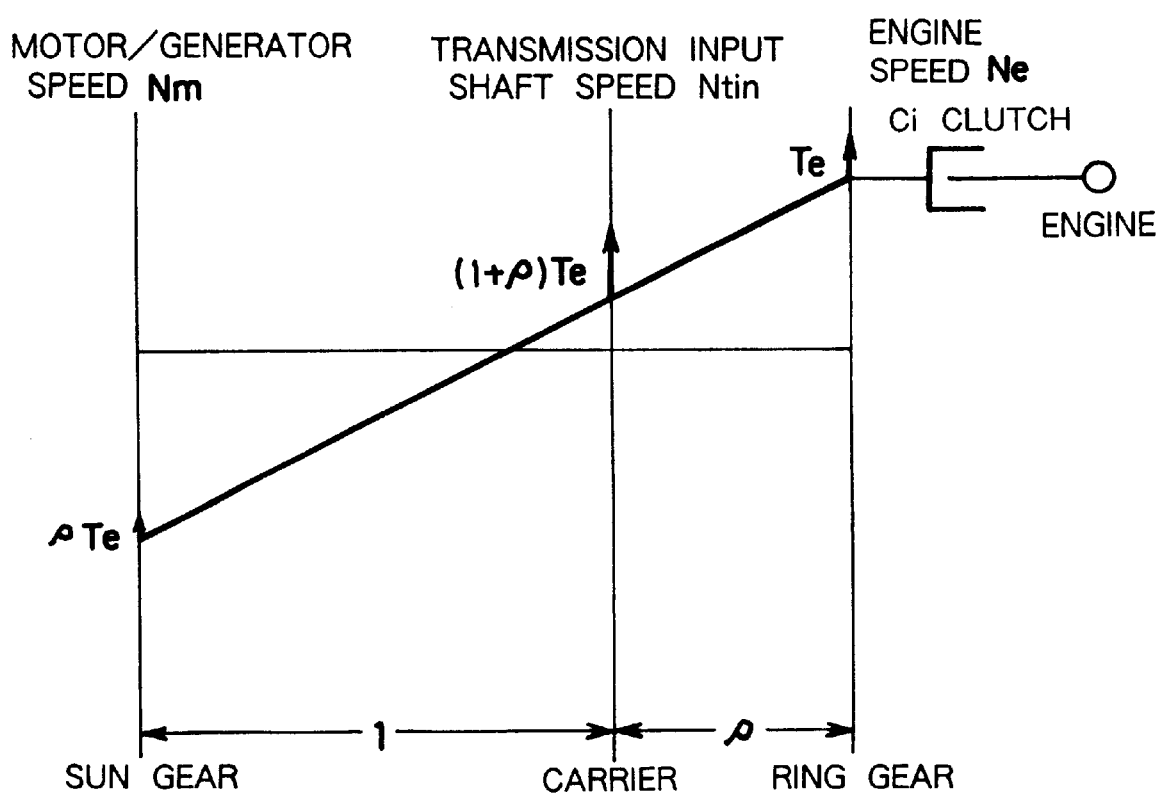
FIG. 3 is a diagram tabulating the running modes to be set by the drive system.
FIG. 4 is a nomographic diagram of a torque synthesizing/distributing mechanism in the drive system shown in FIG. 2.

FIG. 3 tabulates the running modes which can be set by the drive system shown in FIG. 2. In FIG. 3, symbols ○ denote the applied state, and symbols X denote the released state. Here will be briefly described the individual running modes. Of these, the motor running mode is one in which the vehicle is run exclusively by the output of the motor/generator 2. In this motor running mode, the input clutch Ci is released or partially applied, or temporarily applied, and the integral clutch Cd is applied. As a result, the planetary gear mechanism 11 is integrated in its entirety so that the motor/generator 2 is directly coupled to the transmission 15 to input the motor torque to the transmission 15.

The engine running mode is one in which the vehicle is run by the output of the engine 1 and in which the electric power is generated, if necessary. In this mode, both the input clutch Ci and the integral clutch Cd are applied to couple the engine 1 to the ring gear 13 and to integrate the planetary gear mechanism 11 as a whole. As a result, the output torque of the engine 1 is transmitted to the integrated planetary gear mechanism 11 and further to the transmission 15. Since the motor/generator 2 is coupled to the integrated planetary gear mechanism 11, on the other hand, the motor/generator 2 can be rotated by the engine 1 to generate the electric power. Since the output torque of the motor/generator 2 can be transmitted from the planetary gear mechanism 11 to the transmission 15, moreover, the output torque of the engine 1 and the output torque of the motor/generator 2 can be synthesized and outputted.

Here will be described an assist mode. Since the aforementioned torque synthesizing/distributing mechanism 10 is constructed of the planetary gear mechanism 11, the output torque can be changed in various ways by the differential action of the planetary gear mechanism 11. In this assist mode, therefore, for the differential action of the planetary gear mechanism 11, the integral clutch Cd is released whereas the input clutch Ci is applied, so that the engine 1 is coupled to the ring gear 13. In this case: the carrier 14 coupled to the transmission 15 acts as an output element; the ring gear 13 acts as an input element; and the sun gear 12 acts as a reaction element.

In this state, the output torque of the engine 1 is transmitted to the ring gear 13, and the motor/generator 2 and the sun gear 12 are rotated backward. Then, the carrier 14 is stopped or rotated at a lower speed than that of the ring gear 13. If the motor/generator 2 is rotated backward to bring the carrier 14 into a stopped state, more specifically, the vehicle can be kept in the stopped state. If the backward speed of the motor/generator 2 and the sun gear 12 connected to the former is gradually reduced, moreover, the carrier 14 rotates in the same direction as that of the engine 1, and its speed gradually rises. Therefore, the torque to be established at the carrier 14 is either the sum of the output torque of the engine 1 and the reaction torque of the motor/generator 2 or the torque which is augmented according to the gear ratio in the planetary gear mechanism 11. This results in that the engine torque is augmented by the motor torque.

Moreover, a neutral mode is one in which no torque is inputted to the transmission 15. In this neutral mode, both the input clutch Ci and the integral clutch Cd are released. In the planetary gear mechanism 11, therefore, the ring gear 13 rotates idly to relieve the torque, so that the output torque of the engine 1 or the motor/generator 2 will not be inputted to the transmission 15 even if it rotates. This establishes the neutral state in which no driving torque is generated.

In the hybrid vehicle drive system thus far described, the mode is shifted from the assist mode, in which the torque of the motor/generator 2 is added to the engine torque, to the engine running mode in which the vehicle is run with the engine 1, when an increase in the output is demanded by depressing the accelerator pedal. The states of the torque and the speed in the assist mode are illustrated by the nomographic diagram of the planetary gear mechanism 11 in FIG. 4. In FIG. 4, reference letter ρ designates the gear ratio of the planetary gear mechanism 11, that is, the ratio of the number of teeth of the sun gear 12 to the number of teeth of the ring gear 13.

When the input clutch Ci is applied to connect the engine 1 to the ring gear 13 so that the torque is transmitted from the carrier 14 to the transmission 15 by activating the engine 1 and the motor/generator 2, the following Formula holds among the engine speed Ne, the speed Nm of the motor/generator 2 and the input speed Ntin of the transmission 15 (i.e., the output speed of the torque synthesizing/distributing mechanism 10):

$$Nm=((1+\rho) \cdot Ntin-Ne)/\rho.$$

In this state, moreover, the engine 1 generates an output torque Te (i.e., a torque to be inputted to the ring gear 13), and the motor/generator 2 generates a reaction torque of (ρ×Te). As a result, the carrier 14 acting as the output member generates a torque of ((1+ρ)×Te. In the assist mode, more specifically, the summed torque of the engine torque Te and the reaction torque (ρ×Te) of the motor/generator 2 is outputted to generate a driving force satisfying the demand for increasing the output (i.e., an acceleration demand).

Figure 1:
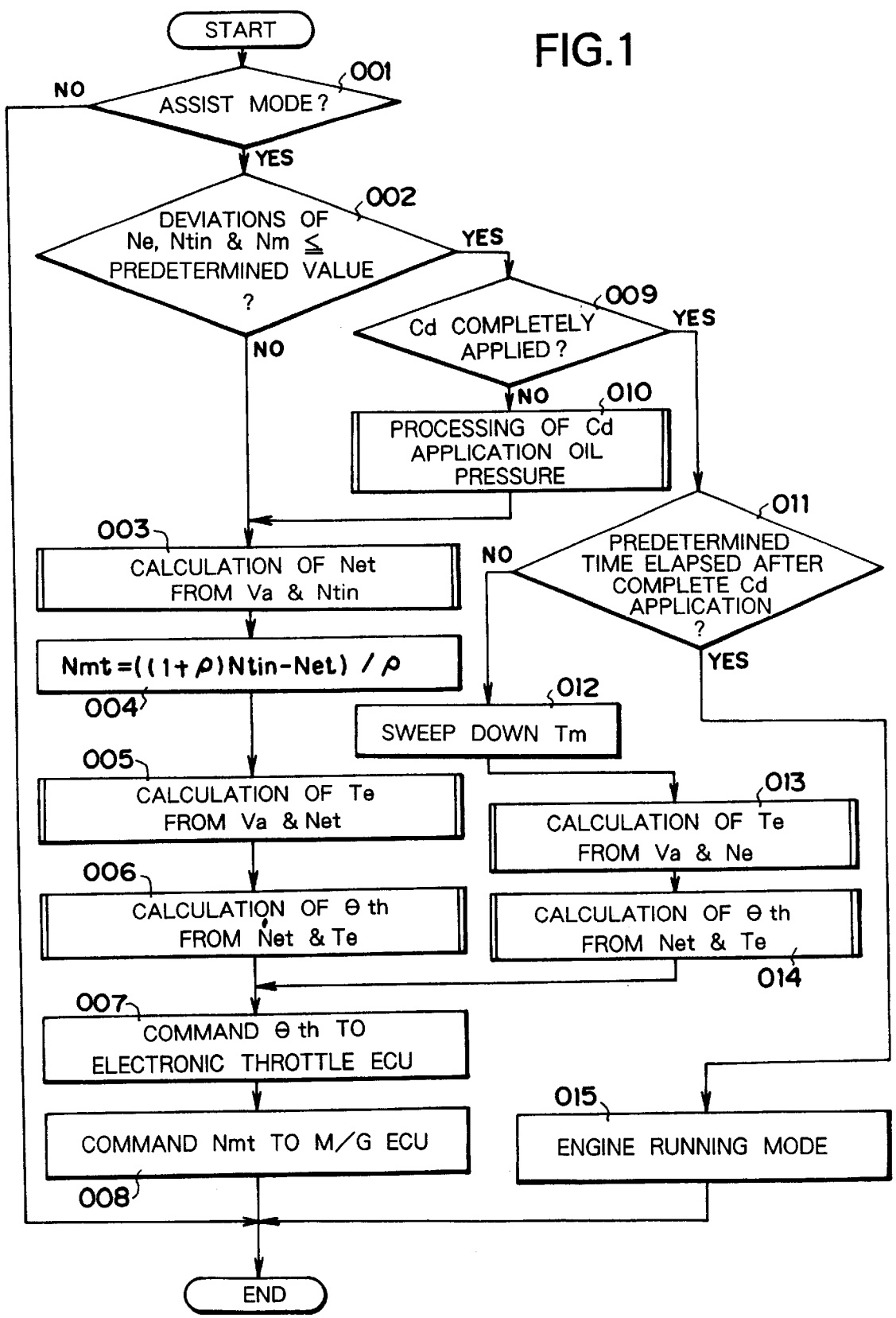
FIG. 1 is a flow chart showing one example of the output control routine of an engine and a motor/generator in an assist mode to be executed by the drive control system of the invention.

In this case, the speed Nm of the motor/generator 2 is gradually increased till it becomes equal to the engine speed Ne, and the mode shifts to the engine running mode. In this routine, the speed Nm of the motor/generator 2 is controlled in the following manner. One example of this control routine is shown in FIG. 1. First of all, it is decided (at Step 001) whether or not the assist mode is set. When the answer of Step 001 is negative because the running mode other than the assist mode is set, this routine is skipped out without any control. When the answer of Step 001 is affirmative, on the contrary, it is decided (at Step 002) whether or not the deviations of the engine speed Ne, the transmission input speed Ntin and the speed Nm of the motor/generator 2 are equal to or less than a predetermined value. This predetermined value (or threshold level), adopted for the decision of Step 002, is a small value near zero. At Step 002, therefore, it is decided whether or not the speed Nm of the motor/generator 2 has reached the engine speed Ne.

If the relation among the individual speeds is in the state illustrated in FIG. 4, the answer of Step 002 is negative. Then, a target engine speed Net is determined (at Step 003) on the basis of an accelerator opening Va and the transmission input speed Ntin. The target engine speed Net is determined, for example, on the basis of a map using the accelerator opening Va and the transmission input speed Ntin as parameters and is set to the larger value for the larger parameters. On the other hand, the deviations are so set the smaller for the higher transmission input speed Ntin that it becomes substantially zero for a speed as high as to apply the integral clutch Cd or to allow the planetary gear mechanism 11 to rotate as a whole. Here, the accelerator opening Va corresponds to the output demand of the invention.

The relation, as expressed by the above-specified Formula, holds among the engine speed Ne, the speed Nm of the motor/generator 2 and the transmission input speed Ntin. By substituting the target engine speed Net into the engine speed of the Formula, therefore, the target speed Nmt of the motor/generator 2 is determined (at Step 004). That is:

$$Nmt = ((1+\rho) \cdot Ntin - Net)/\rho.$$

On the other hand, the engine torque demand value Te is determined (at Step 005) on the basis of the accelerator opening Va and the target engine speed Net. This engine torque demand value Te can be calculated on the basis of a prepared map, for example. Next, a target electronic throttle opening θth to be set by the electronic throttle valve 3 is determined (at Step 006) on the basis of the target engine speed Net and the engine torque demand value Te. This target electronic throttle opening θth can be calculated on the basis of a prepared map, for example.

The target electronic throttle opening θth thus determined is commanded to the electronic control unit 4 for the electronic throttle valve (at Step 007), and the target speed Nmt of the motor/generator 2 is commanded to the electronic control unit 9 for the motor/generator (at Step 008). In other words, the electronic throttle valve 3 is controlled (or feedback-controlled) to the target opening, and the motor/generator 2 is controlled (or feedback-controlled) to the target speed.

According to the control shown in FIG. 1, therefore, the target speed Nmt of the motor/generator 2 is set on the basis of the target engine speed Net, and the motor/generator 2 is controlled to the target speed. When the output demand such as the depression stroke of the accelerator pedal changes, therefore, the accompanying change in the target engine speed leads to the change in the target speed (or the controlled variable) of the motor/generator 2. In other words, the output demand is reflected on the speed control of the motor/generator 2. As a result, when the output demand decreases after increase, the target engine speed Net decreases so that the target speed of the motor/generator 2 rises. When the output demand further increases after increase, on the contrary, the target engine speed Net increases so that the target speed of the motor/generator 2 lowers. As a result, the torque to forcibly change the transmission input speed Ntin does not occur, but the input torque of the transmission 15, as appearing as the sum of the engine torque and the torque of the motor/generator 2, changes smoothly following the output demand so that any unintentional fluctuation of the driving force can be prevented to keep the riding comfort satisfactory.

When the speed Nm of the motor/generator 2 is controlled as above to increase gradually, the speed Nm of the motor/generator 2 and the transmission input speed Ntin (i.e., the speed of the carrier 14) gradually approach the engine speed Ne. When the deviations of these individual speeds Ne, Nm and Ntin go down the predetermined value, that is, when these speeds become substantially equal, the answer of Step 002 is affirmative. It is, then, decided (at Step 009) whether or not the integral clutch Cd is completely applied. This decision can be made in terms of the output state of the control signal to apply the integral clutch Cd, the controlled variable of the (not-shown) valve to regulate the applying pressure, or the time elapsed from the output of the control signal.

When the answer of Step 009 is negative because the integral clutch Cd is not completely applied yet, the oil pressure for applying the integral clutch Cd is processed (at Step 010). This processing is exemplified by feeding a high oil pressure at the beginning of the application control so as to reduce the pack clearance, by then keeping the oil pressure at a relatively low level, and by then raising (or sweeping up) the application oil pressure gradually. After the start of the oil pressure processing at Step 010, the routine returns to Step 003, from which the aforementioned control of the rise in the speed of the motor/generator 2 is continued.

By continuing the oil pressure processing of Step 010, the application oil pressure of the integral clutch Cd gradually rises till the integral clutch Cd is completely applied. Then, the answer of Step 009 is affirmative, and the routine advances to Step 011. At this Step 011, it is decided whether or not the time period elapsed after the complete application of the integral clutch Cd exceeds a predetermined value. When the answer of Step 011 is negative because the predetermined time has not elapsed from the complete application of the integral clutch Cd, the output torque Tm of the motor/generator 2 is gradually lowered or swept down (at Step 012). In this control, the output torque of the motor/generator 2 is so gently lowered that the reduction in the driving force cannot be physically felt by the driver.

In parallel with this control of Step 012, the engine torque demand Te is determined (at Step 013) on the basis of the accelerator opening Va and the engine speed Ne, and the target electronic throttle opening θth is determined (at Step 014) on the basis of the target engine speed Net and the engine torque demand Te. The controls of these Steps 013 and 014 are similar to the aforementioned ones of Steps 005 and 006. After Step 014, the routine advances to Step 007, at which the electronic throttle valve 3 and the motor/generator 2 are controlled like before.

When the output torque of the motor/generator 2 is gradually lowered while raising the output of the engine 1 so that the predetermined time elapses after the complete application of the integral clutch Cd, then the answer of Step 011 is affirmative. Simultaneously with this, the mode is switched from the assist mode to the engine running mode (at Step 015). Specifically, the vehicle is run by the drive of the engine 1 only, with the engine 1 being directly connected to the transmission 15 through the torque synthesizing/distributing mechanism 10.

Figure 5:
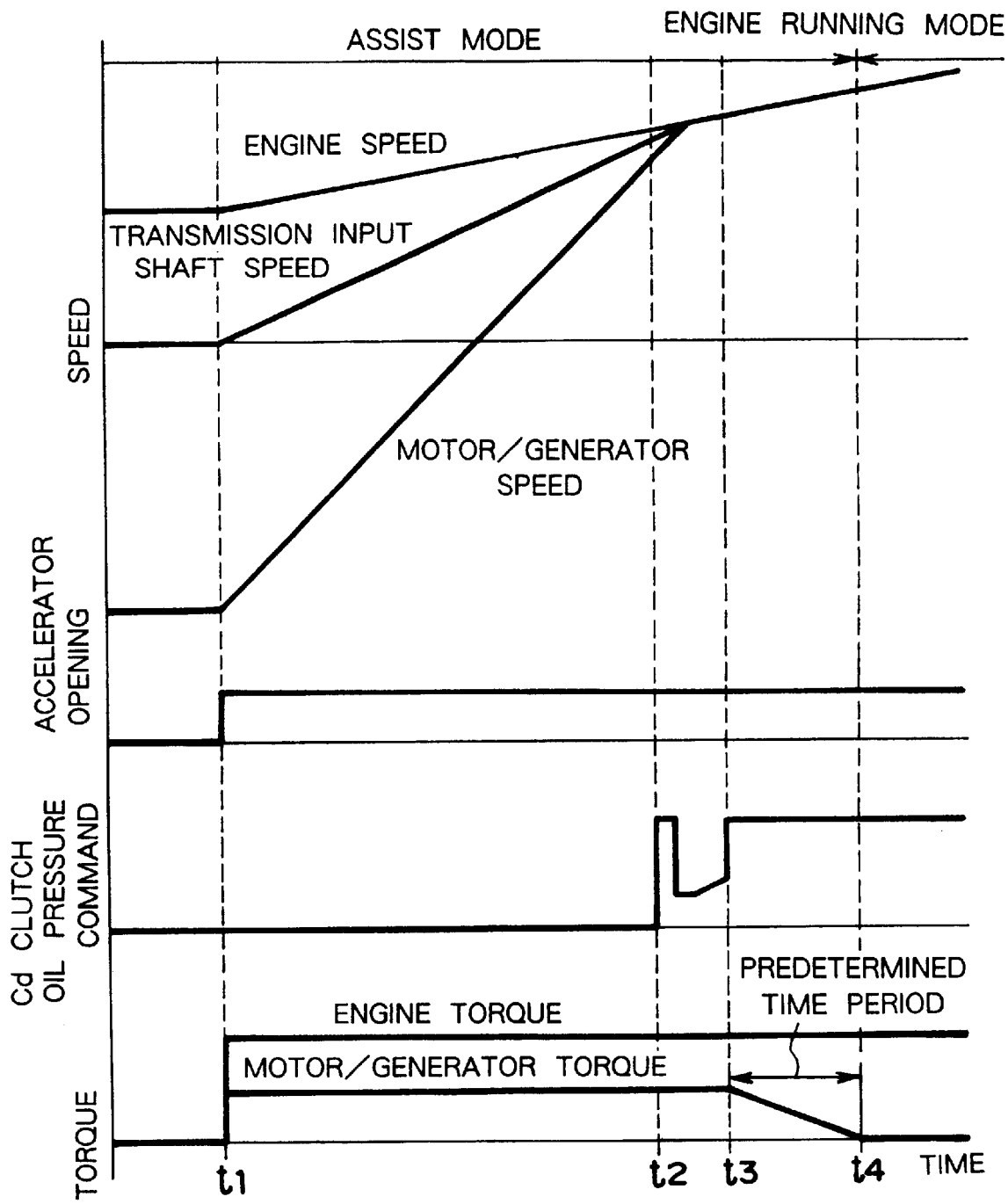
FIG. 5 is a time chart schematically illustrating changes in the speed and the torque in the case where the control shown in FIG. 1 is executed.

The changes in the speed and the torque for the aforementioned controls of FIG. 1 are illustrated in FIG. 5. When the accelerator opening is increased at an instant t1 while the vehicle is run in the assist mode in which the engine 1 and the motor/generator 2 are activated, the aforementioned controls of Step 003 to Step 008 are executed because the deviations among the engine speed Ne, the transmission input speed Ntin and the speed Nm of the motor/generator 2 are large at the instant. As a result, the engine speed Ne gradually rises together with the speed Nm of the motor/generator 2, so that the transmission input speed Ntin rises, accordingly.

As the speed of the motor/generator 2 rises, as described above, there decreases the deviations among the engine speed Ne, the speed Nm of the motor/generator 2 and the transmission input speed Ntin. When these speed deviations go down the predetermined value, the answer of Step 002 is affirmative, the control to apply the integral clutch Cd is started at an instant t2. This oil pressure control includes: the so-called "fast fill" to feed a relatively high oil pressure at the beginning of the control; the subsequent low pressure standby to keep a relatively low pressure; the sweep-up to raise the oil pressure gradually; and the boost to raise the oil pressure finally to the line pressure. As a result, the command value of the oil pressure of the integral clutch Cd changes in magnitude, as illustrated in FIG. 5.

When the oil pressure is raised to the line pressure to apply the integral clutch Cd completely, the torque Tm of the motor/generator 2 is swept down from an instant t3. When a predetermined time period elapses, the torque Tm of the motor/generator 2 becomes substantially zero, and the mode is switched at an instant t4 from the assist mode to the motor running mode. Then, the vehicle is run with the output of the engine 1 which is controlled according to the accelerator opening.

Figure 6:
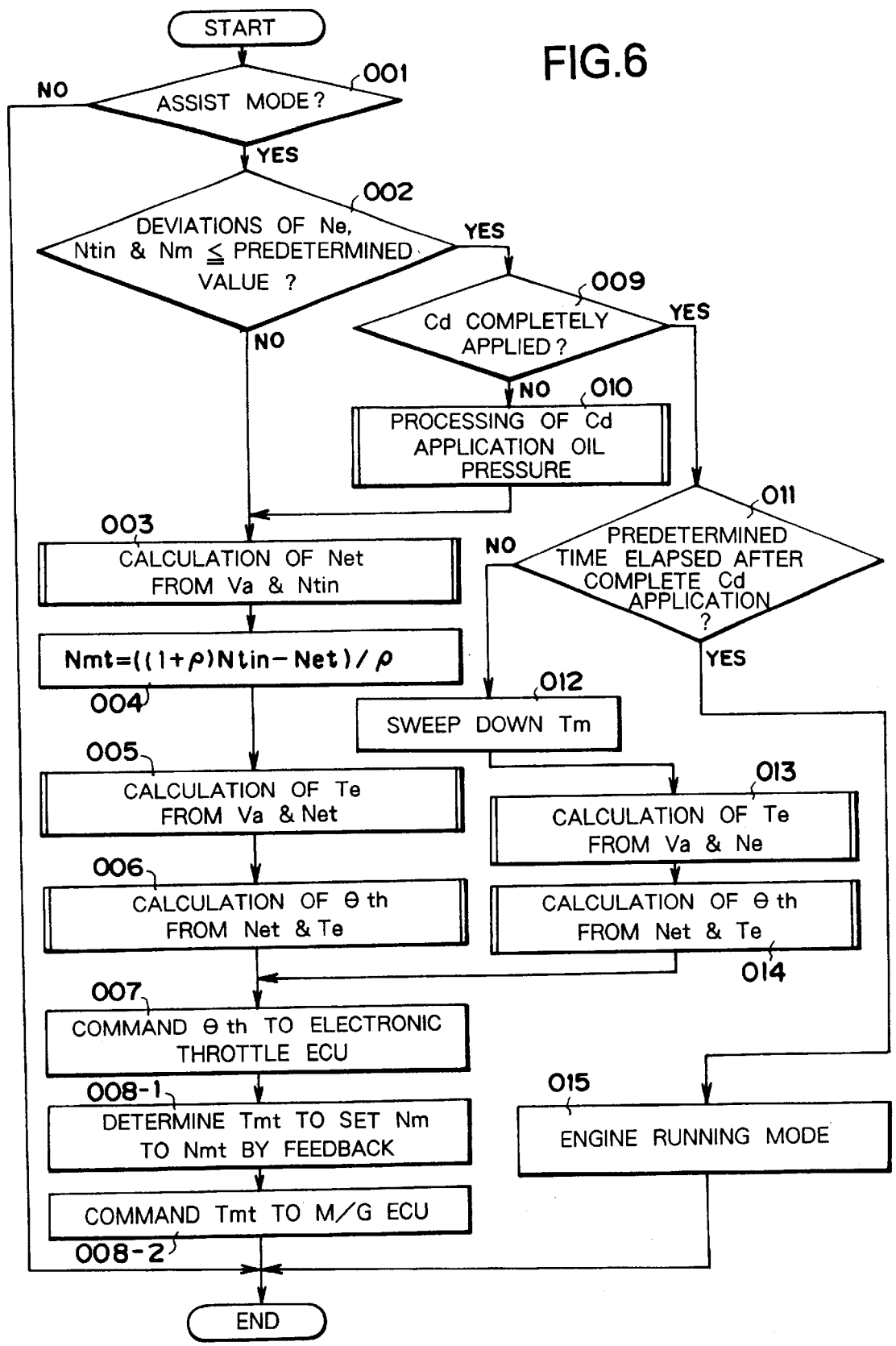
FIG. 6 is a flow chart showing an example in which Step 008 in the flow chart shown in FIG. 1 is changed to have another control content.

In the assist mode, as described before, the vehicle is run by adding the torque of the motor/generator 2 to the engine torque. If the torque of the motor/generator 2 is increased, therefore, the driving torque rises to increase the vehicle speed gradually so that the speed of the motor/generator 2 rises, accordingly. When the speed of the motor/generator 2 is controlled to the target value, therefore, not the speed but the torque may be feedback-controlled. This example is illustrated in the flow chart of FIG. 6, in which the control of Step 008 of FIG. 1 is modified.

Specifically, the target torque value Tmt of the motor/generator 2 is determined (at Step 008-1) by the feedback so that the speed Nm of the motor/generator 2 may reach the target speed Nmt determined at Step 004. Moreover, the target torque value Tmt is commanded to the electronic control unit 9 for the motor/generator 2 (at Step 008-2). By this control, too, the motor/generator 2 can be controlled, as expected, according to the engine torque thereby to prevent the unintentional change in the driving force.

Here will be described the relation between the aforementioned embodiment and the invention. The function of Step 003 corresponds to the target engine speed detecting means and the speed control means in the invention. On the other hand: the function of Step 004 corresponds to the target motor speed detecting means in the invention; the function of Step 006 corresponds to the engine output control means in the invention; and the function of Step 008 corresponds to the motor speed control means in the invention. Moreover, the functions of Step 008-1 and Step 008-2 shown in FIG. 6 correspond to the motor torque control means in the invention.

In the assist mode in the hybrid drive system, as has been described with reference to FIG. 4, the reaction torque (ρ·Te) or the product of the engine torque Te and the gear ratio ρ is caused to act on the motor/generator 2 through the sun gear 12 by inputting the power from the engine 1 to the ring gear 13. If, in this case, the motor/generator 2 generates a torque corresponding to the reaction torque (ρ·Te), this reaction torque (ρ·Te) is added to the engine torque Te and is outputted together from the carrier 14 to establish the substantial assist mode. If the motor/generator 2 is rotated backward by the torque having a value of the product of the engine torque Te and the gear ratio ρ, on the contrary, the electric power is generated. Moreover, the relations of the three, i.e., the engine speed Ne, the transmission input speed Ntin and the speed Nm of the motor/generator 2 are expressed by the foregoing Formula. Therefore, the speed of the carrier 14 (i.e., the transmission input speed Ntin) is reduced to zero by rotating the ring gear 13 (or the engine 1) forward and the sun gear 12 (or the motor/generator 2) backward and by setting their speed ratio suitably.

If the motor/generator 2 is rotated backward at the speed of the product of the speed as high as the idling speed of the engine 1 and the gear ratio ρ while the vehicle is being stopped with the transmission input speed Ntin being zero, therefore, the engine 1 can be kept in the active state at a level as high as the idling speed. By thus controlling the motor/generator 2 in the vehicle stop state, the input clutch Ci can be applied, and the engine 1 can be continuously activated. This makes it unnecessary to switch the input clutch Ci from the released state to the applied state at the start from the stop state or to restart the engine 1, so that the delay in the start can be prevented in advance.

Figure 7:
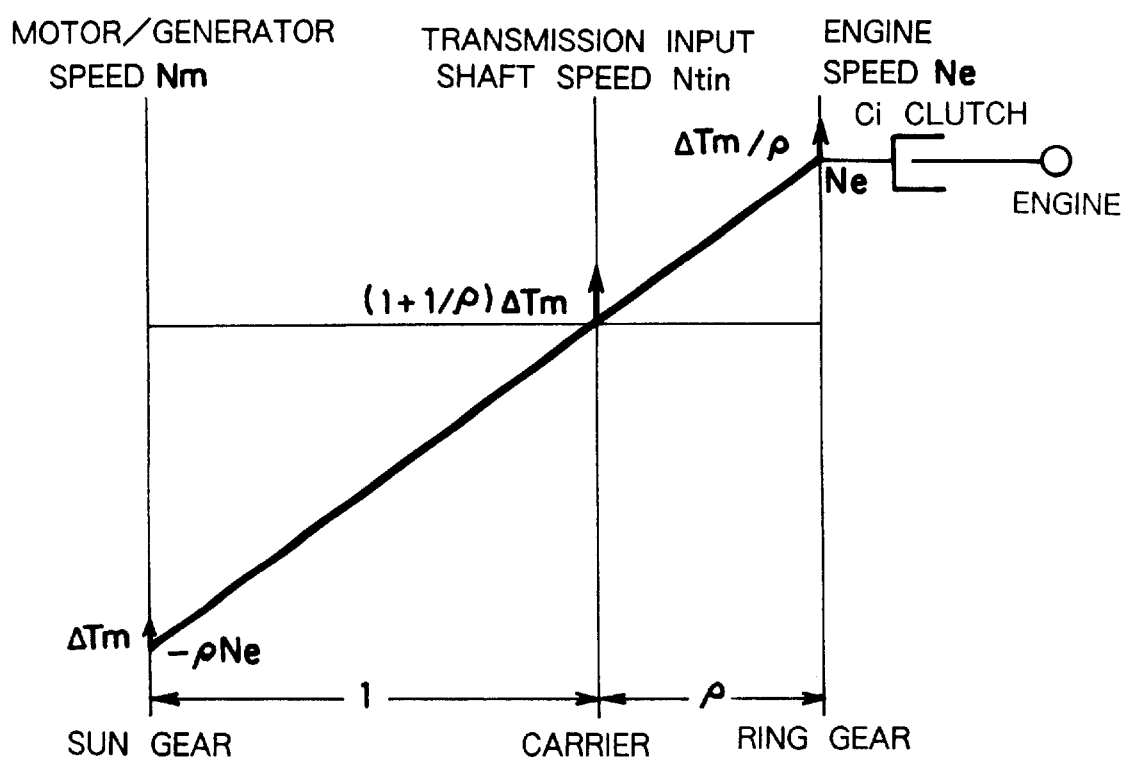
FIG. 7 is a nomographic diagram for explaining the control state in which a creep torque is generated by the torque synthesizing/distributing mechanism.

A nomographic diagram of the torque synthesizing/distributing mechanism 10 in the case where the vehicle is stopped with the speed Ne of the engine 1 being kept as high as the idling speed and with the input clutch Ci being applied is illustrated in FIG. 7. If, in this state, a slight positive torque ΔTm is added to the torque of the motor/generator 2, a negative torque ΔTm/ρ according to the added torque ΔTm and the gear ratio ρ is applied to the engine 1. If a torque corresponding to the negative torque ΔTm/ρ is generated by the engine 1 to keep the idling speed, the summed torque of (1+1/ρ) ΔTm is generated in the carrier 14, i.e., the input member of the transmission 15.

This is similar to the creep torque in the automatic transmission equipped with a fluid torque converter. By thus controlling the motor/generator 2 and the engine 1 in the vehicle stop state, therefore, the starting operation and the reverse run are facilitated. In this case, moreover, the motor/generator 2 generates the electric power because it receives a negative torque resulting from the action for the engine 1 to keep the idling speed.

In the aforementioned controls of the engine 1 and the motor/generator 2 in the vehicle stop state, the engine 1 is kept in the driving state, and the electric power is generated accordingly. Therefore, the controls are effective in case the state of charge of the battery 8 is so short as to make insufficient the output torque of the motor/generator 2. Since the fuel is consumed by activating the engine 1, however, the fuel consumption may deteriorate the fuel economy. It is therefore preferable to limit the aforementioned control for the vehicle stop by activating the engine 1 to the case in which the state of charge of the battery 8 is short. In case the charge of the battery 8 is sufficient, however, it is preferable to suppress the fuel consumption by stopping the engine 1 when the vehicle stops. Here, if the state of charge is sufficient, the driving force will not become short even at the start by the motor/generator 2.

In the assist mode, as described above, the reaction torque at the motor/generator 2 can be added to the engine torque and outputted together while charging the battery 8. It is therefore preferable to charge the battery 8 by making a change to the assist mode in accordance with the charged state of the battery 8 while the vehicle is running in the engine running mode. Thus, it is possible to prevent in advance the situation that the driving force becomes short at a high load time when the output torque of the motor/generator 2 to be applied to the engine torque has to be raised.

FIG. 8 shows one example for the control. It is decided (at Step 021) whether or not the vehicle is in the engine running mode. When this answer is affirmative, it is decided (at Step 022) whether or not a high load run is demanded. This decision of the high load run can be made in terms of a large accelerator opening, for example. When the answer of Step 022 is affirmative because the high load run is demanded, it is decided (at Step 023) whether or not the state of charge of the battery 8 is insufficient. When the charge of the battery 8 is short, the mode shifts to the assist mode (at Step 024). Of the input clutch Ci and the integral clutch Cd being both applied, more specifically, the integral clutch Cd is released. Here, the answer of each decision Step 021, 022 or 023 is negative, the routine is skipped out.

In this assist mode, as has been described with reference to FIG. 4, the torque (ρ·Te) according to the engine torque Te and the gear ratio ρ is applied to the motor/generator 2. In order to increase the driving force and the vehicle speed at that instant, moreover, a torque equal to or higher than the loaded torque (ρ·Te) is applied from the motor/generator 2 to the sun gear 12 so that the summed torque (1+ρ)Te is inputted to the transmission 15. As a result, the driving force accords to the demand for the high load run. If, in this case, the motor/generator 2 is rotated backward, as shown in FIG. 4, it generates the electric power. As a result, the driving force satisfying the demand for the high load run can be established, and the charge of the battery 8 can be sufficiently increased to prepare for the case in which a high output torque is demanded for the motor/generator 2.

Here, in the embodiment thus far described, the output demand is determined on the basis of the accelerator opening. However, the invention should not be limited to the embodiment, but the output demand could also be determined artificially on the basis of either a demand for an output increase from a controller when the run of the vehicle is controlled by the so-called "cruise control" or "navigation system" for keeping the vehicle speed at a predetermined value, or a demand for an output increase from a controller at the so-called "trailing control" in which the vehicle is automatically run trailing a preceding vehicle. On the other hand, the torque synthesizing/distributing mechanism of the invention should not be limited to the aforementioned construction of the single-pinion type planetary gear mechanism but might be exemplified by a mechanism of the construction for the differential actions among three rotary elements such as the double-pinion type planetary gear mechanism or the differential gear mechanism in which a pinion gear meshes with a pair of side gears.

Here will be synthetically described the advantages to be obtained from the invention. At the time of the running state in which the driving force is established on the basis of the torque composed of the output torque of the engine and the output torque of the motor, according to the invention, the target speed of the engine on the basis of the output demand is reflected on the controlled variable of the engine and the controlled variable of the motor. As a result, the controlled variable of the motor changes in response to the change in the output demand as soon as the output demand for the engine changes. As a result, a correspondence is made between the change in the output demand for the engine and the change in the driving force. This correspondence makes it possible to prevent in advance any unintentional driving force or driving state and an accompanying deterioration in the riding comfort.

According to the invention, on the other hand, the target speed of the engine is so set that the speed of the engine, the speed of the motor and the output speed of the torque synthesizing/distributing mechanism may be equalized as the vehicle speed increases. This makes it possible to smoothly execute the control to establish an integrally rotational state (or an integral state) of the entirety of the torque synthesizing/distributing mechanism for the run with the engine.

According to the invention, moreover, when the entirety of the torque synthesizing/distributing mechanism is to be integrated in response to a demand for increasing an output, the pack clearance is reduced by feeding the oil pressure abruptly to the integral clutch so that the control responsibility is improved. After the torque synthesizing/distributing mechanism was integrated, still moreover, the output torque of the motor is gradually lowered so that the fluctuation of the driving torque is smoothed to improve the riding comfort.

What is claimed is:

1. A drive control system for a hybrid vehicle, which has a torque synthesizing/distributing mechanism for synthesizing an output torque of an electric motor and an output torque of an internal combustion engine and for outputting a synthesized torque therefrom, comprising:

target engine speed detecting means for determining a target speed of the engine on the basis of an output demand for the engine and an output speed of said torque synthesizing/distributing mechanism;

target motor speed detecting means for determining a target speed of the motor on the basis of the target speed of the engine and the output speed of said torque synthesizing/distributing mechanism;

engine output control means for controlling the output of the engine to the output torque which is determined on the basis of the output demand for the engine and the target speed of the engine; and motor speed control means for controlling an output speed of the motor to the target motor speed which is determined by said target motor speed detecting means.

2. A hybrid vehicle drive control system according to claim 1, further comprising:

speed control means for setting the target speed of the engine so as to eliminate a difference among the speed of the engine, the speed of the motor and the output speed of said torque synthesizing/distributing mechanism as a vehicle speed increases.

3. A hybrid vehicle drive control system according to claim 1, wherein said torque synthesizing/distributing mechanism includes a gear mechanism having three rotary elements for performing a differential action.

4. A hybrid vehicle drive control system according to claim 3, wherein a first one of said three rotary elements is selectively connected to the engine through clutch means whereas a second rotary element is connected to the motor.

5. A hybrid vehicle drive control system according to claim 4, further comprising:

an integral clutch for connecting any two of said rotary elements selectively.

6. A hybrid vehicle drive control system according to claim 5, further comprising:

speed difference detecting means for detecting a difference between the output speed of the engine and the output speed of the motor; and application command means for applying said integral clutch when the difference, as detected by said speed difference detecting means, between the output speed of the engine and the output speed of the motor is less than a predetermined value.

7. A hybrid vehicle drive control system according to claim 6, wherein said integral clutch includes a clutch to be applied by an oil pressure, and wherein said application command means includes means for setting the oil pressure at the beginning of application of said integral clutch to a level higher than a level later applied for steady state operation of said integral clutch.

8. A hybrid vehicle drive control system according to claim 6, further comprising:

torque lowering means for lowering the output torque of the motor gradually after said integral clutch was completely applied.

9. A drive control system for a hybrid vehicle having a torque synthesizing/distributing mechanism for synthesizing an output torque of an electric motor and an output torque of an internal combustion engine and for outputting a synthesized torque therefrom comprising:

target engine speed detecting means for determining a target speed of the engine on the basis of an output demand for the engine and an output speed of said torque synthesizing/distributing mechanism;

target motor speed detecting means for determining a target speed of the motor on the basis of the target speed of the engine and the output speed of said torque synthesizing/distributing mechanism;

engine output control means for controlling the output of the engine to the output torque which is determined on the basis of the output demand for the engine and the target speed of the engine; and motor torque control means for controlling the output torque of the motor so that the speed of the motor may be said target motor speed.

* * * * *

UNITED STATES PATENT AND TRADEMARK OFFICE
CERTIFICATE OF CORRECTION

PATENT NO. : 6,315,068 B1
DATED : November 13, 2001
INVENTOR(S) : Kazumi Hoshiya et al.

It is certified that error appears in the above-identified patent and that said Letters Patent is hereby corrected as shown below:

<u>Column 14,</u>
Lines 19-20, replace "may be" with -- is --.

Signed and Sealed this

Twenty-seventh Day of August, 2002

Attest:

JAMES E. ROGAN
*Attesting Officer*  *Director of the United States Patent and Trademark Office*